United States Patent [19]
Handa et al.

[11] Patent Number: 5,539,867
[45] Date of Patent: Jul. 23, 1996

[54] GRAPH DISPLAY APPARATUS FOR DISPLAYING DIFFERENT GRAPHS OF A FUNCTIONAL FORMULA BASED ON INPUTTED COEFFICIENT DATA

[75] Inventors: Akihiro Handa, Ome; Yukihiro Nakano, Tachikawa; Kazuhiko Arikawa, Fussa; Osamu Negishi, Akishima, all of Japan

[73] Assignee: Casio Computer Co., Ltd., Tokyo, Japan

[21] Appl. No.: 343,768

[22] Filed: Nov. 22, 1994

[30] Foreign Application Priority Data

Nov. 30, 1993 [JP] Japan ................................ 5-299489

[51] Int. Cl.$^6$ .................................................. G06T 11/00
[52] U.S. Cl. ................. 395/140; 364/710.01; 364/710.1; 364/710.14
[58] Field of Search ........................ 395/140, 155, 395/157, 161; 364/710.01–710.14

[56] References Cited

U.S. PATENT DOCUMENTS

| | | | |
|---|---|---|---|
| 4,217,702 | 8/1980 | Bennett | 434/188 |
| 4,794,553 | 12/1988 | Watanabe et al. | 395/140 X |
| 4,794,554 | 12/1988 | Tamiya | 364/710.01 |

*Primary Examiner*—Almis R. Jankus
*Attorney, Agent, or Firm*—Frishauf, Holtz, Goodman, Langer & Chick

[57] ABSTRACT

A graph display apparatus wherein a dynamic invention has the following arrangement. A dynamic graph key in a key input unit is operated by a user and a functional formula subjected to graph calculation and a change range and a change pitch of a coefficient value present in the functional formula input using numeric. symbol keys are stored in a formula register in a RAM (Random Access Memory). When an execution key is operated in a state wherein a coefficient change speed is stored in a register, the coefficient value of the functional formula is sequentially replaced within the change range at the change pitch. Graphic data of the functional formula and corresponding graph formulas with the changes in coefficients are sequentially stored in a plurality of video memory areas in a VRAM (Video Random Access Memory), and graphs and corresponding graph formulas for the changes in coefficients are sequentially read out in accordance with the coefficient change speed to be sequentially switched and displayed on a display unit. When the coefficient present in the formula is changed as a parameter, the graphs corresponding to the formulas are sequentially displayed, thus easily grasping the graph change state with the change in coefficient.

15 Claims, 5 Drawing Sheets

GRAPH DISPLAY APPARATUS FOR DISPLAYING DIFFERENT GRAPHS OF A FUNCTIONAL FORMULA BASED ON INPUTTED COEFFICIENT DATA

BACKGROUND OF THE INVENTION

1. Field of the Invention

The present invention relates to a graph display apparatus for inputting a functional formula or the like, calculating the graph of the input functional formula or the like, and displaying the calculated graph and, more particularly, to a graph display apparatus which can display the graphs of a functional formula obtained by changing coefficients of the functional formula.

2. Description of the Related Art

Electronic calculators which have a functional calculation function and which also have a graph display function for calculating and displaying the graph of an input functional formula have been commercially available.

More specifically, a functional formula to be displayed is input in advance, and X-coordinate values in units of display dots on a dot-matrix display apparatus are also substituted in the input functional formula by inputting X- and Y-coordinate ranges (Xmin, Xmax) and (Ymin, Ymax) of the functional formula. With this operation, calculated Y-coordinate values are sequentially written on a VRAM (video memory), thus displaying the graph of the functional formula. Such a graph display technique is described in, e.g., U.S. Pat. No. 4,794,553, U.S. Pat. No. 4,794,554, and the like. Therefore, in the conventional graph display apparatus, both a functional formula to be displayed and X- and Y-coordinate ranges must be input with keys, resulting in very cumbersome operations.

SUMMARY OF THE INVENTION

The present invention has been made in consideration of the above situation, and has as its object to provide a graph display apparatus which can display the different graphs of a functional formula with an easy key-input operation.

In order to achieve the above object, according to the present invention, a graph display apparatus comprises: formula storage means for storing formula data consisting of at least coefficient data and variable data; coefficient range storage means for storing change range data of the coefficient data; and graph display means for changing a coefficient for the formula data stored in the formula storage means within the change range data stored in the coefficient range storage means to display a graph.

With this arrangement, according to the present invention, the coefficient for the formula stored in the formula storage means is sequentially changed within the change range stored in the coefficient range storage means, and the graphs of the formula obtained by sequentially changing the coefficient are calculated by the graphic arithmetic means, and the calculated graphs are switched and displayed on the display means in a change order.

DETAILED DESCRIPTION OF THE PREFERRED EMBODIMENT

An embodiment of the present invention will be described below with reference to the accompanying drawings.

Figure 1:
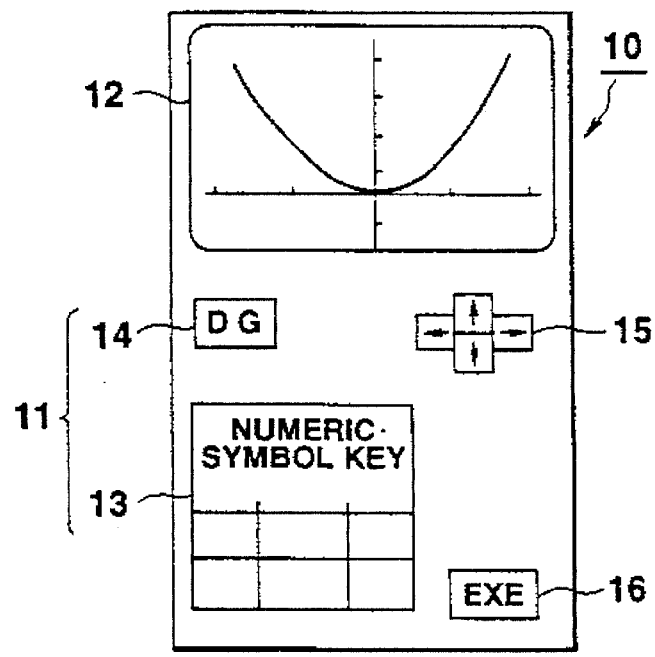
FIG. 1 is a plan view showing the outer appearance of a graph display apparatus according to an embodiment of the present invention.

FIG. 1 is a plan view showing the outer appearance of a graph display apparatus according to the present invention.

An apparatus main body 10 of this graph display apparatus has a size which allows a user to hold the apparatus in his or her hand.

A key input unit 11 and a graphic display unit 12 consisting of a dot-matrix liquid crystal screen are arranged on the front surface of the apparatus main body 10.

The key input unit 11 comprises numeric. symbol keys 13 for inputting functional formulas and the like to be displayed as graphs, inputting coefficient values present in the functional formulas and change ranges of the coefficients as parameters, inputting change speeds of the coefficient parameters, and designating and inputting coordinate ranges (Xmin, Xmax) and (Ymin, Ymax) of the X- and Y-axes on the graphic display unit 12, ha "D. G" (dynamic graph) key 14 for sequentially calculating and displaying the graphs with changes in coefficients, an "EXE" key 16 for executing graphic arithmetic processing, cursor keys 15 for selecting various data on the graphic display unit 12 and moving a pointer, and the like.

The graphic display unit 12 has a 64 (vertical dots) ×128 (horizontal dots) liquid crystal display screen, and displays the graphs of functional formulas and the like input using the numeric. symbol keys 13 in correspondence with the coordinate ranges of the X- and Y-axes designated by a user.

When a sequential graph display mode with the changes in coefficients is set by operating the "D. G" key 14, the graphs obtained by sequentially replacing coefficients are continuously switched and displayed on the graphic display unit 12.

Figure 2:
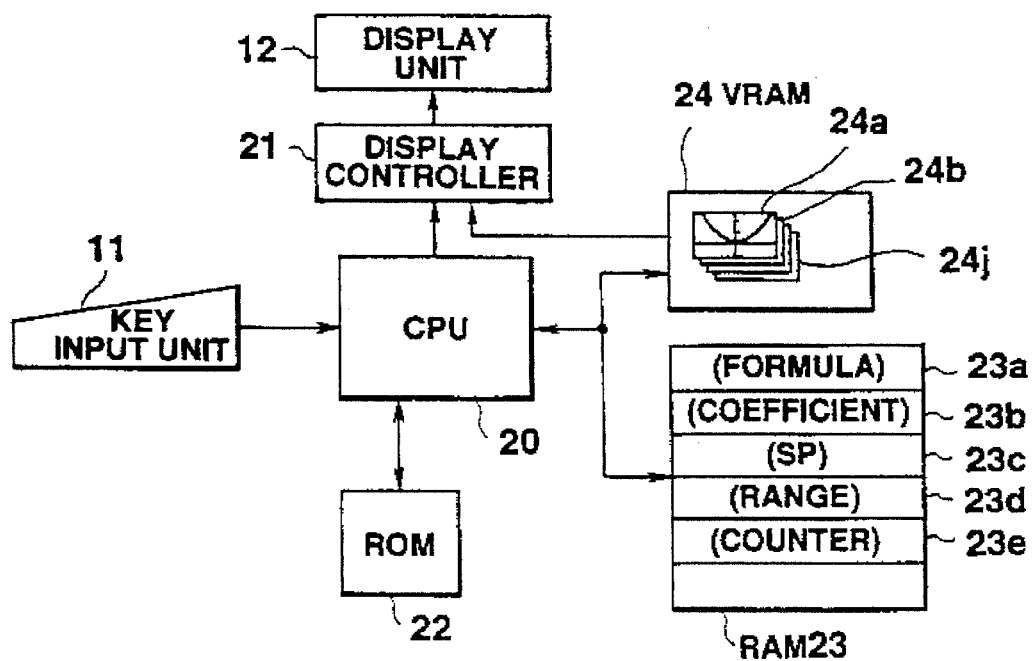
FIG. 2 is a block diagram showing the arrangement of an electronic circuit of the graph display apparatus.

FIG. 2 is a block diagram showing the arrangement of an electronic circuit of the graph display apparatus.

The electronic circuit of the graph display apparatus comprises a CPU (central processing unit) 20, and the CPU 20 executes operation control of the respective circuit units.

The CPU 20 is connected to the key input unit 11 and to the graphic display unit 12 via a display controller 21, and is also connected to a ROM 22, a RAM 23, and a VRAM (Video Random Access Memory)24.

The ROM 22 pre-stores a basic system program for operating the graphic display apparatus, and also prestores a graph display processing program for performing a graph display in correspondence with a key-input functional formula and the like, a graphic arithmetic processing program of the input formula with the graph display processing, a graph switching display processing program with the changes in coefficients, and the like.

The control operation of the CPU 20 is executed in accordance with the programs stored in the ROM 22.

The RAM 23 comprises a formula register 23a for storing and managing functional formulas and setting data of coefficient parameters input in accordance with operations of the numeric. symbol keys 13, a coefficient register 23b for storing coefficient values substituted in the functional formulas on the basis of the functional formulas and the setting data of the coefficient parameters stored in the formula register 23a, an SP register 23c for storing change speeds (time intervals) of the coefficient parameters input in accordance with the operations of the numeric. symbol keys 13, a range resister 23d for storing X- and Y-coordinate ranges (Xmin, Xmax) and (Ymin, Ymax) set for the graphic display unit 12, a counter register 23e for storing time data of a timer incorporated in the CPU 20 updated in accordance with the change speeds of the coefficient parameters set in the SP register 23c, and the like, in addition to key input registers, various flag registers, and the like.

The VRAM 24 has 10 video memory areas each having a capacity of 64 to 128 bits and a one-to-one correspondence with dots on a display region of the graphic display unit 12. When the coefficients for the input formulas are changed, graphic data corresponding to the formulas for changed coefficients are stored in respective video memory areas 24a to 24j.

In this case, the graphs stored in the video memory areas 24a to 24j in the VRAM 24 are sequentially switched and displayed on the graphic display unit 12, thus continuously switching and displaying the graphs with the changes in coefficients of the input formulas.

The operation of the graph display apparatus with the above-mentioned arrangement will be described below.

Figure 3:
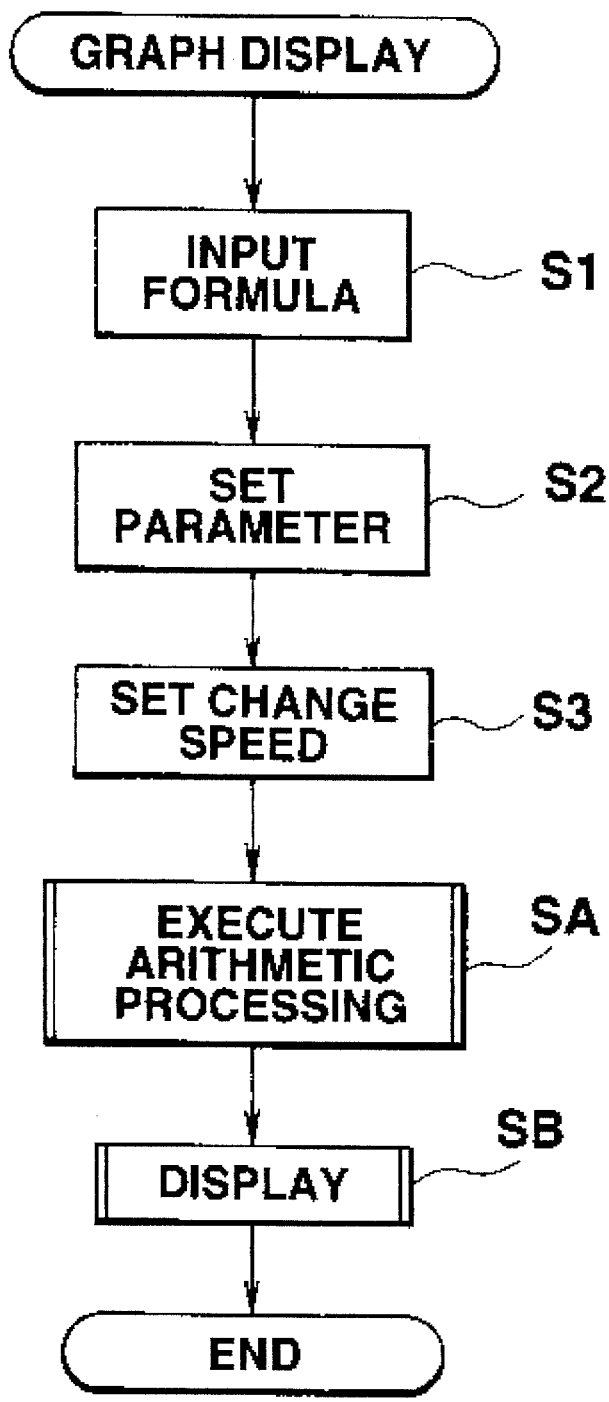
FIG. 3 is a flow chart showing graph display processing of the graph display apparatus.

FIG. 3 is a flow chart showing graph display processing of the graph display apparatus.

Figure 6:
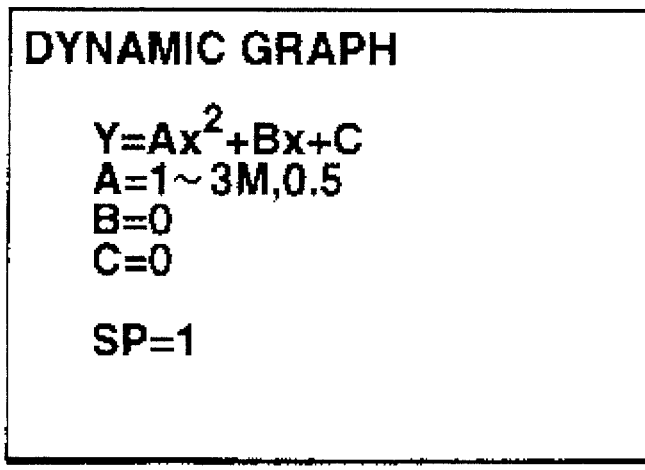
FIG. 6 is a view showing an input display state of a functional formula, coefficient parameters, and a coefficient change speed with the graph display processing of the graph display apparatus.

More specifically, in order to sequentially calculating and displaying the graphs of the formulas with the changes in coefficients, when the "DG" (dynamic graph) key 14 in the key input unit 11 is operated, the graph display processing is started in FIG. 3. The numeric. symbol keys 13 are operated in accordance with a guidance display displayed on the graphic display unit 12 to input a functional formula subjected to graph calculation in step S1. For example, when a quadratic function $Y=Ax^2+Bx+C$ is input as a functional formula, the input functional formula is stored in the formula register 23a in the RAM 23, and $Y=Ax^2+Bx+C$ is displayed as shown in FIG. 6. In step S2, coefficient values present in the input functional formula and change ranges and change pitches of the coefficient values are input. For example, when a coefficient A is changed within the range of 1 to 3 every 0.5, and coefficients B and C are respectively set 0, A=1 to 3, 0.5, B=0, and C=0 are input. The input coefficient setting data are also stored in the formula register 23a in the RAM 23, and displayed as shown in FIG. 6. In step S3, if a change speed is, e.g., 1 sec, SP=1 is input. Change speed data of the coefficient A is written in the SP register 23c in the RAM 23, and also displayed on the display unit 12 as shown in FIG. 6.

Figure 4:
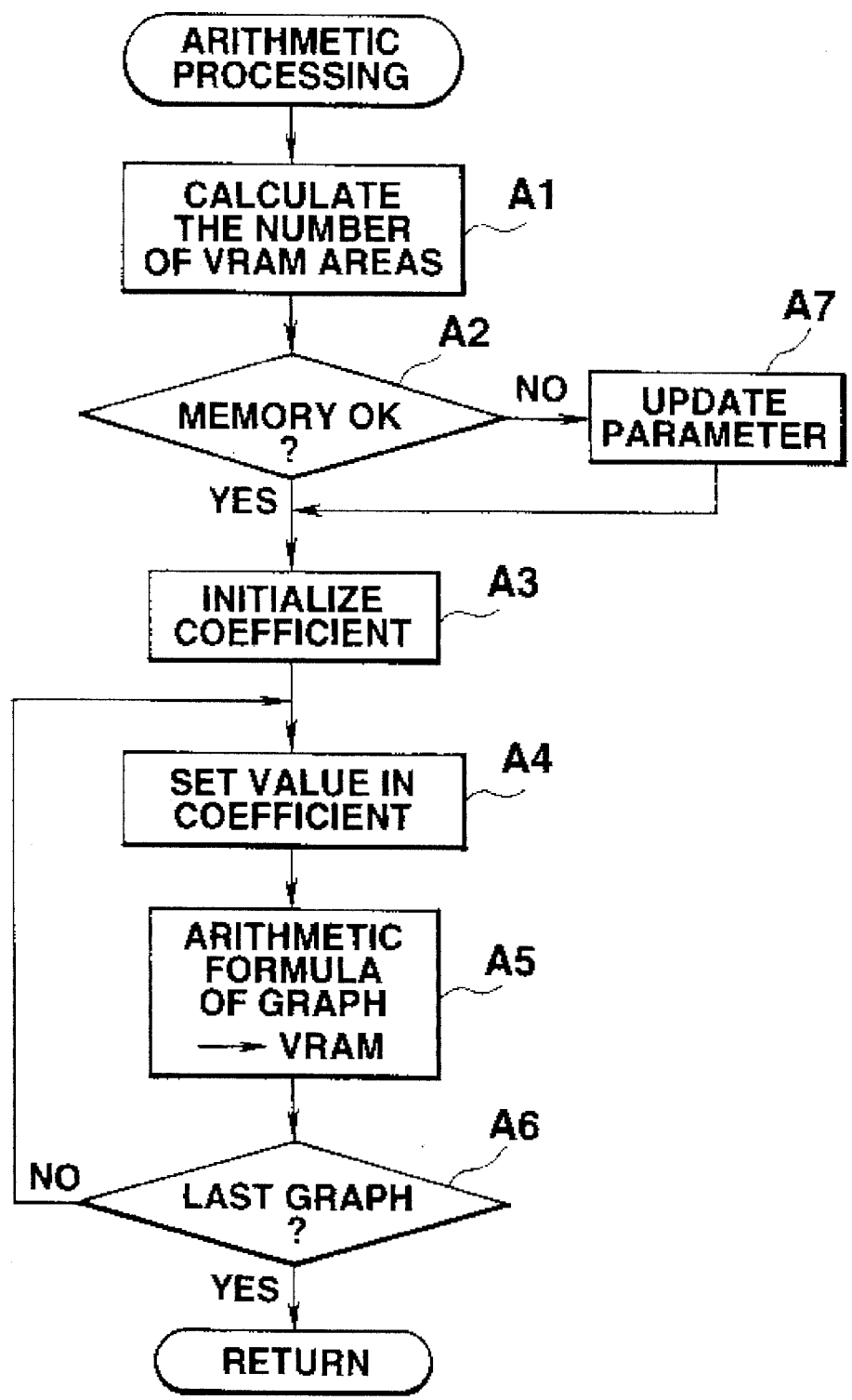
FIG. 4 is a flow chart showing graphic arithmetic processing with the graph display processing of the graph display apparatus.

In next step SA, graphic arithmetic processing described in detail with reference to FIG. 4 is executed. Referring to FIG. 4, the number of graph screens to be displayed with a change in coefficient i.e., the required number of areas of the video memory areas 24a to 24j in the VRAM 24 is calculated in accordance with the following equation (1) on the basis of the change range and change pitch of the coefficient value present in the functional formula stored in the formula register 23a in the RAM 24.

$$\begin{aligned}\text{Number of Video Memory Areas} &= \{(\text{Last Coefficient Value} - \text{Initial Coefficient Value})/\text{Change Pitch}\} + 1 \\ &= \{(3-1)/0.5\} + 1 = 5\end{aligned} \quad (1)$$

It is checked whether the number of video memory areas calculated in step A1 falls within the 10 video memory areas 24a to 24j included in the VRAM 24 or not (step A2). In this case, since the required number of video memory areas is five, it is determined "Yes" in step A2, and initial coefficient values "A=1", "B=0", and "C=0" are set in the coefficient register 23b in the RAM 23 (step A3).

The coefficient values "A=1", "B=0", and "C=0" set in the coefficient register 23b are substituted in the functional formula "$Y=Ax^2+Bx+C$" stored in the formula register 23a, and Y-coordinate values with respect to the X-coordinate values in units of display dots are calculated in accordance with X- and Y-coordinate ranges on the graphic display unit 12 preset in the range register 23d. Graphic data corresponding to "$Y=1 \cdot x^2$" obtained by this operation and its graph formula "$Y=x^2$" are written in the first video memory area 24a in the VRAM 24 (steps A4 and A5).

It is checked whether the graphic data written in the VRAM 24 is the last graph, i.e., graphic data corresponding to the last coefficient values is calculated and written or not (step A6). In this case, since only the first graphic data corresponding to the initial coefficient values "A=1", "B=0", and "C=0" is obtained, it is determined "NO" in step A6, and the flow returns to the processings in step A4 and the subsequent steps (step A6→A4).

The second coefficient values "A=1.5", "B=0", and "C=0" changed in accordance with the coefficient change range "A=1 to 3" and its change pitch "0.5" pre-stored in the formula register 23a are set in the coefficient register 23b in the RAM 23 and substituted in the functional formula "$Y=Ax^2+Bx+C$", and then Y-coordinate values with respect to the X-coordinate values in units of display dots are calculated. Graphic data corresponding to "$Y=1.5 \cdot x^2$" obtained by this operation and its graph formula "$Y=1.5x^2$" are written in the second video memory area 24b in the VRAM 24 (steps A4 and A5).

In this case, since the graphic data written in the VRAM 24 is the second graphic data corresponding to the second coefficient values "A=1.5", "B=0", and "C=0", it is determined "NO" in step A6, and the flow returns to the processings in step A4 and the sequential steps (step A6→A4).

The third coefficient values "A=2", "B=0", and "C=0" changed in accordance with the coefficient change range "A=1 to 3" and its change pitch "0.5" pre-stored in the formula register 23a are set in the coefficient register 23b in the RAM 23 and substituted in the functional formula "$Y=Ax^2+Bx+C$", and then Y-coordinate values with respect to the X-coordinate values in units of display dots are calculated. Graphic data corresponding to "$Y=2 \cdot x^2$" obtained by this operation and its graph formula "$Y=2x^2$" are written in the third video memory area 24c in the VRAM 24 (steps A4 and A5).

In this case, since the graphic data written in the VRAM 24 is the third graphic data corresponding to the third coefficient values "A=2", "B=0", and "C=0" it is determined "NO" in step A6, and the flow returns to the processings in step A4 and the subsequent steps (step A6→A4).

In the same manner as described above, the fourth coefficient values "A=2.5", "B=0", and "C=0" changed in accordance with the coefficient change range "A=1 to 3" and its change pitch "0.5" pre-stored in the formula register 23a are set in the coefficient register 23b in the RAM 23 and substituted in the functional formula "Y=Ax²+Bx+C", and then Y-coordinate values with respect to the X-coordinate values in units of display dots are calculated. Graphic data corresponding to "Y=2.5·x²" obtained by this operation and its graph formula "Y=2.5x²" are written in the fourth video memory area 24d in the VRAM 24 (steps A4 and A5).

The last coefficient values "A=3", "B=0", and "C=0" are set in the coefficient register 23b and substituted in the functional formula "Y=Ax²+Bx+C". Graphic data corresponding to "Y=3·x²" obtained by this operation and its graph formula "Y=3x²" are written in the fifth video memory area 24e in the VRAM 24 (steps A4 and A5).

Figure 5:
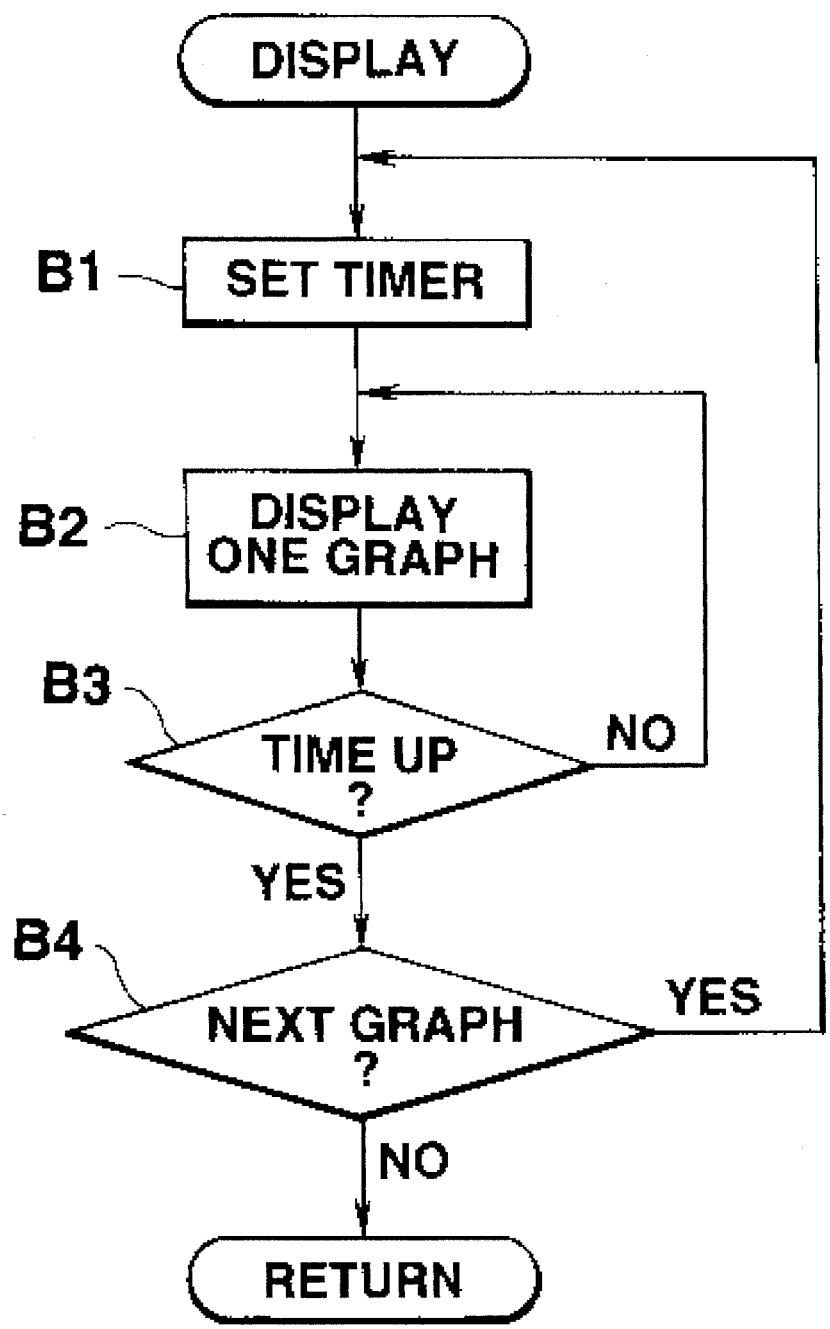
FIG. 5 is a flow chart showing graph switching display processing with the graph display processing of the graph display apparatus.

Since the graphic data written in the VRAM 24 is the fifth graphic data corresponding to the fifth coefficient values "A=3", "B=0", and "C=0", it is determined "YES" in step A6, this graphic arithmetic processing is ended, and graph switching display processing is started in FIG. 5 (step SA→SB).

On the other hand, if a coefficient change pitch stored in the formula register 23a is, e.g., "0.2" and the number of VRAM areas calculated in step A1 is 11, which is larger by one than the 10 video memory areas 24a to 24j stored in the VRAM 24, the coefficient change pitch is reset at, e.g., "0.3" to decrease the required number of areas of the video memory areas 24a to 24j to 10 or less (step A1, step A2→A7). Note that the change pitch may be fixed at "0.2" and the last coefficient value may be changed to "2.8".

The graphic arithmetic processing of the functional formula with the change in coefficient is executed in the same manner as described above (steps A3 to A6).

In step SA of FIG. 3, when five graphic data and corresponding graph formulas obtained by changing the coefficient A of the functional formula "Y=Ax²+Bx+C" within the range of 1 to 3 every "0.5" are written in the corresponding video memory areas 24a to 24e in the VRAM 24, the graph switching display processing described in detail with reference to FIG. 5 is executed in next step SB.

Referring to FIG. 5, first of all, the coefficient change speed (1 sec) set in the SP register 23c in the RAM 23 is set in the CPU 20 as time-up check data of time counter data in the counter register 23e (step B1).

The first graphic data stored in the video memory area 24a of the VRAM 24 is read out, and the readout data is displayed on the graphic display unit 12. With this operation, a graph 25a and its graph formula "Y=x²∞ obtained by replacing the coefficient A of the functional formula "Y=Ax²+Bx+C" with the initial coefficient value "1" are displayed, as shown in FIG. 7 (step B2).

It is checked whether the time counter data to be updated in the counter register 23e reaches the time-up check data (1 sec) set in the CPU 20 in correspondence with the coefficient change speed. That is, when it is determined that the graph 25a corresponding to the initial coefficient value "1" has been displayed for 1 sec, the second graphic data stored in the video memory area 24b in the VRAM 24 is read out, and the readout second graphic data is switched and displayed on the graphic display unit 12 (step B3→B4→B1, B2).

Figure 7:
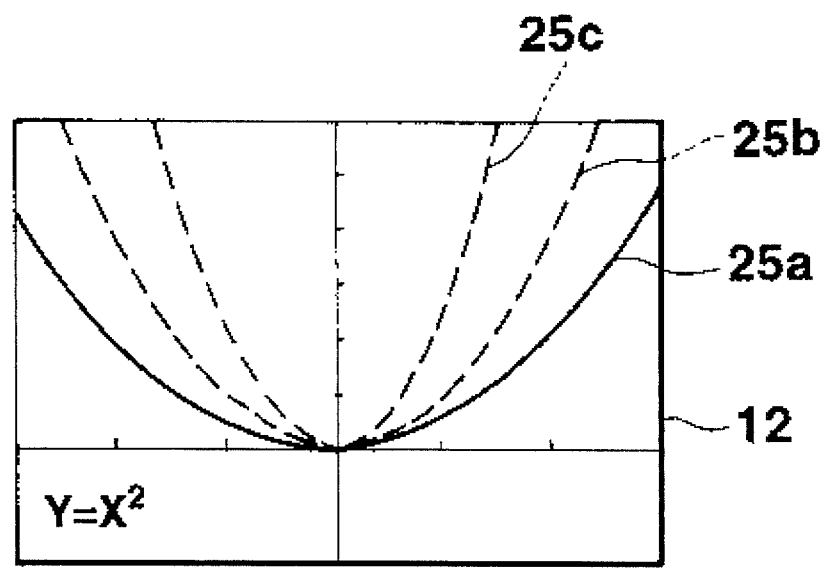
FIG. 7 is a view showing a graph display state in accordance with a change in coefficient of the input formula with the graph display processing of the graph display apparatus.

In this case, as shown in FIG. 7, a graph 25b and its graph formula "Y=1.5x²" obtained by replacing the coefficient A of the functional formula "Y=Ax²+Bx+C" with the second coefficient value "1.5" has been displayed for 1 sec. Thereafter, in the same manner as described above, the third to fifth graphic data stored in the corresponding video memory areas 24c to 24e in the VRAM 24 are sequentially read out for 1 sec. A graph 25c and its graph formula "Y=2x²" obtained by replacing the coefficient A with the third coefficient value "2", a graph 25d and its graph formula "Y=2.5x²" (not shown) obtained by replacing the coefficient A with the fourth coefficient value "2.5", and a graph 25e and its graph formula "Y=3x²" (not shown) obtained by replacing the coefficient A with the last coefficient value "3" are respectively switched and displayed for 1 sec in an order named (steps B1 to B4).

Thereafter, when the "EXE" key 16 is operated again, the graphic arithmetic processing (SA) in FIG. 4 and the graph switching display processing (SB) in FIG. 5 are repeated to display graphs corresponding to the changes in coefficients, in the same manner as described above.

Therefore, according to the graph display apparatus with the above-mentioned arrangement, after the "DG" (dynamic graph) key 14 in the key input unit 11 is operated, the functional formula subjected to graph calculation and the change ranges and change pitches of the coefficients present in the functional formula are stored in the formula register 23a in the RAM 23, and the coefficient change speed is stored in the SP register 23c. In this state, when the "EXE" key 16 is operated, the coefficient values of the functional formula are sequentially replaced in accordance with the change pitches within the change ranges, and graphic data and corresponding graph formulas of the functional formula with the changes in coefficients are sequentially stored in the plurality of video memory areas 24a, 24b, ... in the VRAM 24. In addition, the graphs and corresponding graph formulas for changed coefficients stored in the VRAM 24 are read out in accordance with the coefficient change speed set in the SP register 23c in a change order, and the readout graphs and graph formulas are sequentially switched and displayed on the graphic display unit 12 through the display controller 21. With this operation, for example, when a certain coefficient is changed within an arbitrary range as a parameter, graphs corresponding to formulas can be sequentially displayed, and a graph change state with the change in coefficient can be easily grasped and learned.

In this manner, according to the graph display apparatus of the present invention, coefficients used in a formula stored in the formula storage means are sequentially changed within change ranges stored in the coefficient range storage means, and the graphs of formulas obtained by changing the coefficients are calculated by the graphic arithmetic means in a change order, thus switching and displaying the graphs by the display means in this order.

The graphs obtained by the graphic arithmetic means can be respectively stored in the corresponding individual areas by the graph storage means, and the graphs stored in the individual areas can be sequentially designated, thus switching and displaying the graphs.

Furthermore, the switching time interval of the graph display can be preset by the setting means, thus sequentially switching and displaying the graphs obtained by changing the coefficients at the preset time interval.

With the above-mentioned operations, when the coefficients present in the formula are changed as parameters, the graphs corresponding to the formulas can be sequentially displayed, and the graph change state with the change in coefficient can be easily grasped.

What is claimed is:

1. A graph display apparatus comprising:

formula storage means for storing formula data including at least coefficient data and variable data;

coefficient range storage means for storing data indicating a range within which the coefficient data changes;

graph storage means for storing in individual areas thereof graph data respectively obtained by changing, within the range stored in the coefficient range storage means, the coefficient data with respect to the formula data stored in the formula storage means;

time interval data storage means for storing time interval data; and graph display means for sequentially switching and displaying the graph data stored in the individual areas of the graph storage means with a time interval based on the time interval data stored in the time interval data storage means.

2. An apparatus according to claim 1, wherein:

the data indicating the range, stored in said coefficient range storage means, includes at least minimum value data and maximum value data; and said graph display means further comprises display control means for changing the coefficient data from one of the minimum value and the maximum value in a change order to switch and display the graph data in the change order.

3. An apparatus according to claim 1, wherein:

the formula data includes quadratic functional formula data using Y and X as variables, and the data indicating the range, stored in said coefficient range storage means, is coefficient data of $X^2$.

4. An apparatus according to claim 1, wherein said graph display means comprises a dot-matrix display unit.

5. An apparatus according to claim 1, further comprising setting means for setting the time interval data stored in said time interval data storage means.

6. An apparatus according to claim 1, wherein said graph display means comprises formula display means for displaying a formula of a displayed graph.

7. A graph display apparatus comprising:

input means for inputting formula data including at least coefficient data and variable data, and data indicating a range within which the coefficient data changes;

storage means for storing the formula data input by the input means, and for storing the inputted data indicating the range within which the coefficient data changes input by the input means;

arithmetic means for changing a coefficient of the formula data stored in the storage means within said range to obtain a plurality of graphic data;

graphic data storage means for storing in individual areas thereof the plurality of graphic data obtained by changing the coefficient by the arithmetic means;

time interval data storage means for storing time interval data; and graph display means for sequentially switching and displaying the graphic data stored in the individual areas of the graphic data storage means with a time interval based on the time interval data stored in the time interval data storage means.

8. An apparatus according to claim 7, wherein the data indicating the range, stored in said storage means, includes at least minimum value data and maximum value data; and said arithmetic means comprises means for changing the coefficient of the formula data from one of the minimum value and the maximum value in a change order to obtain the graphic data in the change order.

9. An apparatus according to claim 7, wherein;

the formula data includes quadratic functional formula data using Y and X as variables; and the data indicating the range is coefficient data of $X^2$.

10. An apparatus according to claim 7, wherein said graph display means comprises a dot-matrix display unit.

11. An apparatus according to claim 7, further comprising setting means for setting the time interval data stored in said time interval data storage means.

12. An apparatus according to claim 7, wherein said graph display means comprises formula display means for displaying a formula of a displayed graph.

13. A graph display apparatus comprising:

formula storage means for storing formula data including at least coefficient data and variable data;

coefficient range storage means for storing data indicating a range within which the coefficient data changes;

change pitch storage means for storing change pitch data of the data indicating the range within which the coefficient data changes stored in the coefficient range storage means;

setting means for respectively setting (i) the formula data to be stored in the formula storage means, (ii) the data indicating the range within which the coefficient data changes to be stored in the coefficient storage means, and (iii) the change pitch data to be stored in the change pitch storage means; and graph display means for changing a coefficient of the formula data stored in the formula storage means within data indicating the range stored in the coefficient range storage means for the change pitch data stored in the change pitch storage means, to display a graph.

14. An apparatus according to claim 13, wherein said graph display means comprises;

arithmetic means for calculating a plurality of graphic data obtained by changing the coefficient of the formula data within said range for each change pitch data stored in said change pitch storage means; and switching display means for switching and displaying the plurality of graphic data calculated by said arithmetic means.

15. An apparatus according to claim 14, further comprising setting means for presetting a switching time interval of a graph display by said switching display means.

* * * * *